(12) United States Patent
Beck et al.

(10) Patent No.: US 8,045,917 B2
(45) Date of Patent: Oct. 25, 2011

(54) SYSTEM AND METHOD FOR DETECTION OF MOBILE OPERATING THROUGH A REPEATER

(75) Inventors: Andrew Beck, Ashburn, VA (US); Joseph P. Kennedy, Jr., Great Falls, VA (US)

(73) Assignee: Andrew, LLC, Hickory, NC (US)

( * ) Notice: Subject to any disclaimer, the term of this patent is extended or adjusted under 35 U.S.C. 154(b) by 782 days.

(21) Appl. No.: 10/586,743

(22) PCT Filed: May 11, 2005

(86) PCT No.: PCT/US2005/016749
§ 371 (c)(1),
(2), (4) Date: Mar. 14, 2008

(87) PCT Pub. No.: WO2005/114871
PCT Pub. Date: Dec. 1, 2005

(65) Prior Publication Data
US 2008/0248744 A1    Oct. 9, 2008

Related U.S. Application Data

(60) Provisional application No. 60/570,067, filed on May 12, 2004, provisional application No. 60/570,081, filed on May 12, 2004, provisional application No. 60/570,082, filed on May 12, 2004.

(51) Int. Cl.
*H04B 3/36* (2006.01)
(52) U.S. Cl. ......... 455/7; 455/11.1; 455/434; 455/67.11
(58) Field of Classification Search ................. 455/11.1, 455/450, 452.1, 452.2, 509, 434, 515, 9, 455/24, 25, 456.1, 456.2, 7, 13.1, 67.11, 455/422.1
See application file for complete search history.

(56) References Cited

U.S. PATENT DOCUMENTS

| | | | |
|---|---|---|---|
| 5,541,979 A * | 7/1996 | Leslie et al. | 455/436 |
| 6,404,775 B1 * | 6/2002 | Leslie et al. | 370/466 |
| 2001/0031621 A1 * | 10/2001 | Schmutz | 455/7 |
| 2002/0072329 A1 * | 6/2002 | Bandeira et al. | 455/7 |
| 2002/0155839 A1 * | 10/2002 | Nisbet | 455/450 |
| 2005/0020203 A1 * | 1/2005 | Losh et al. | 455/11.1 |

* cited by examiner

*Primary Examiner* — John J Lee
(74) *Attorney, Agent, or Firm* — Duane Morris, LLP

(57) ABSTRACT

A system and method for a network analysis system operating in a wireless communication system with repeaters is disclosed. Embodiments of the system and method enable the network analysis system to determine if signals being received by the network receivers arrive directly from a target mobile appliance or if the signals are passing through a repeater. The repeaters through an augmentation measure attribute of a received signal to a network manager and based on these attributes it is determine whether the signal is served by a repeater or other network device.

17 Claims, 5 Drawing Sheets

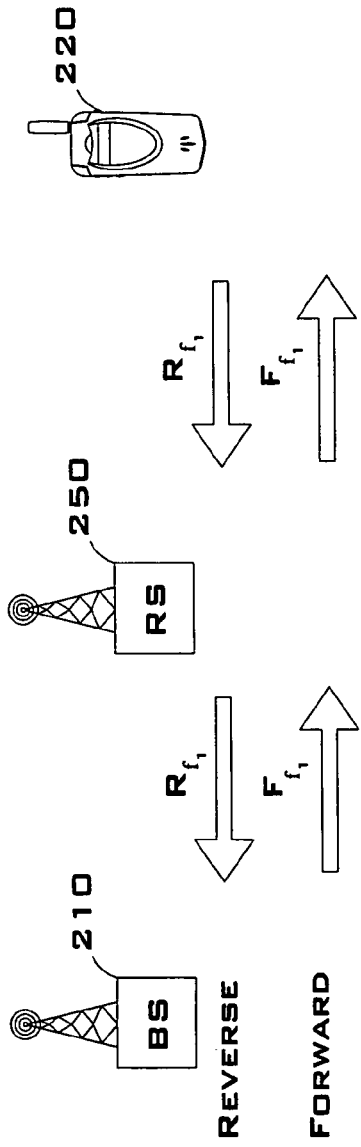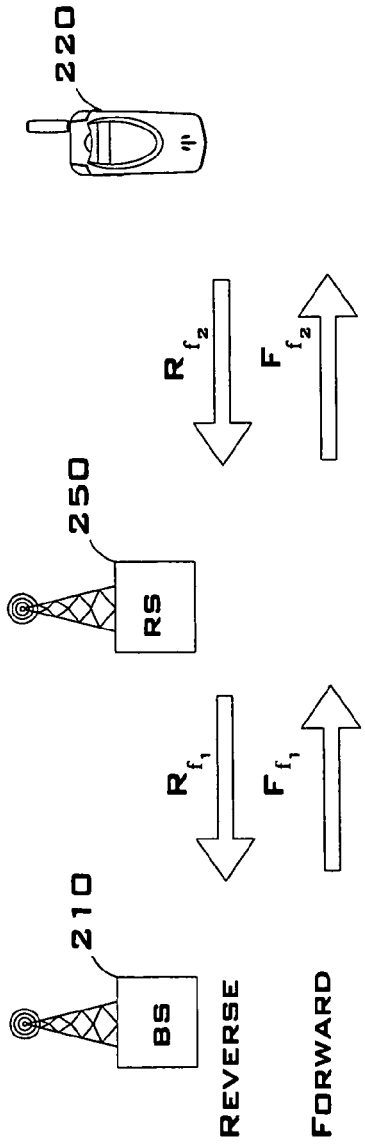

SYSTEM AND METHOD FOR DETECTION OF MOBILE OPERATING THROUGH A REPEATER

CROSS REFERENCES

This non-provisional Application claims priority benefit of co-pending Provisional Patent Application Ser. No. 60/570,067, titled SYSTEM AND METHOD FOR DETECTING A MOBILE STATION OPERATING THROUGH A REPEATER, filed May 12, 2004, the contents of which are herein incorporated by reference.

This non-provisional Application claims priority benefit of co-pending Provisional Patent Application Ser. No. 60/570,081, titled SYSTEM AND METHOD FOR IDENTIFYING THE PATH OR DEVICE ON THE PATH OF A COMMUNICATION SIGNAL USING (1+r(t)) AMPLITUDE MODULATION, filed May 12, 2004, the contents of which are herein incorporated by reference.

The present non-provisional application claims priority benefit of co-pending provisional application Ser. No. 60/570,082, titled SYSTEM AND METHOD FOR IDENTIFYING THE PATH OR DEVICES ON THE PATH OF A COMMUNICATION SIGNAL filed May 12, 2004, the entirety of which is hereby incorporated by reference.

BACKGROUND

Applicant's disclosure is directed generally towards a wireless communications network for determining whether a signal from a mobile appliance is operated on by a repeater or other network device.

The use of wireless communication devices such as telephones, pagers, personal digital assistants, laptop computers, etc., hereinafter referred to collectively as "mobile appliances," has become prevalent in today's society.

FIG. 1 shows a conventional mobile-appliance communication system having base stations 10 a-c for communicating with a mobile appliance 20. Each base station 10 contains signal processing equipment and an antenna for transmitting to and receiving signals from the mobile appliance 20 as well as other base stations. A Base Station Controller ("BSC") and/or Mobile Switching Center ("MSC") 45 typically is connected to each base station 10 through a wire line connection 41.

To meet the ever growing demand for mobile communication, wireless communication systems deploy repeater stations to expand range and concentration of coverage. In FIG. 1, a repeater 50a, associated with base station 10a, is located to extend the coverage area to encompass the back side of the mountain 1. The repeater 50b, associated with base station 10c, is mounted on a building and is used to provide service within the building 2.

Repeaters typically fall into two categories: (1) non-translating, also known as wideband, and (2) translating, also known as narrowband. As shown in FIG. 2a, a non-translating repeater 250 simply passes the forward $F_{f1}$ and reverse $R_{f1}$ frequencies from the base station 210 and mobile appliance 220 respectively to and from the repeater coverage location. Often wideband repeaters are "in-building" or serve limited coverage areas. While the description of non-translating repeaters above and translating repeaters below are described in reference to frequency, their operation can equally be described in terms of channels, and the use of the term frequency should not be construed to limit the scope of the present disclosed subject matter.

A translating repeater assigns the mobile to a different traffic channel unbeknownst to the base station, mobile switch, MPC, and the base station controller. As shown in FIG. 2b, the translating repeater uses the base station traffic channel $R_{f1}$ for repeater 250 to base station 210 communication while the mobile appliance 220 utilizes a separate frequency $R_{f2}$ for mobile to repeater communications. Translating repeaters act similarly in the forward direction using $F_{f1}$ from the base station 210 to the repeater station 250 and $F_{f2}$ from the repeater station 250 to the mobile appliance 220. In both cases, the existence of the repeater is usually transparent to the network.

The function of the repeater station can be assumed to be equivalent to converting all signals in some received bandwidth from a Radio Frequency (RF) to some Intermediate Frequency (IF). The IF signal bandwidth is then up-converted by suitably frequency shifting this bandwidth while concurrently applying both amplification and a fixed delay to the signals.

For example, let the set of signals transmitted by N mobiles in the repeaters' input bandwidth be denoted by $$S(t) = \sum_{k=1}^{N} a(k)x(k,t)\sin(wt),$$

where the signal from a given mobile is denoted by x(k, t). The signal x(k, t) is contained in the repeater bandwidth and w is the angular frequency center of the RF bandwidth. The repeater downshifts the aggregate signal to generate $$D(t) = \sum_{k=1}^{N} a(k)x(k,t)\sin(vt),$$

in which v is now representative of the center of the IF bandwidth. The entire signal D(t) is now converted back to RF by operations that are equivalent to forming the signal $$R(t+T) = G\sum_{k=1}^{N} a(k)x(k,t)\sin(vt)\cos(wt-vt) + G\sum_{k=1}^{N} a(k)x(k,t)\cos(vt)\sin(wt-vt),$$

in which G is the repeater gain. The last equation can be written in a more convenient, mathematical manner by noting that R(t) can be derived from D(t) by writing it as R(t+T) =Re{G exp(j(w−v)tI(t))}, where G exp(j(w−v)t) is the complex representation of the multiplicative signal introduced by the repeater on the downshifted signal bandwidth and I(t) is the complex representation of D(t).

Essentially, the function of the repeater is to convert the RF signal to an IF signal, delay and amplify that IF signal, up-convert the signal back to RF, and transmit the signal. This is true for both translating and non-translating repeaters.

Repeaters typically communicate with the host base station via an RF link as shown in FIG. 3 between base station 310 and repeater 350a. This connection allows remote operation of the repeater without physical ties back to the host base station, which is particularly advantageous in rugged or other areas where laying lines are difficult or costly. Some repeaters, generally non-translating repeaters, use a fiber optic or copper wire "tether" instead of an RF link to communicate with the host base station as shown in FIG. 3, where base station 310 is connected to repeater station 350b by tether 351. RF signals are placed onto the tether at the repeater and then summed into the normal base station antenna path at the antenna feed interface 311 at the host base station. After integration into the normal base station antenna path, the signal from the repeater is indistinguishable to the base station regarding its origin (e.g., from the base station antennas or from a tether). In this tether architecture as well, the host base station has no knowledge of the repeater's existence or that a call is being served by the repeater.

Neither the base station nor the switch knows that a repeater or other network device is serving a call. For example, a repeater installed as an in-building distribution system would use indoor antennas to communicate with the indoor handsets and an outdoor antenna to communicate with the host base station. In order to accomplish this, there is a need to overcome the deficiencies in the prior art by employing a novel system and method that is capable of identifying when a mobile's signal is being received via a repeater or other network device. In view of this need, it is an object of the disclosed subject matter to present a method for determining whether a signal is received directly from the mobile or from a repeater in the communication network.

The ability to discern the difference between direct signals and repeated signals (i.e., signals that arrive via a repeater) allows for the system to better managed and is thus advantageous.

These objects and other advantages of the disclosed subject matter will be readily apparent to one skilled in the art to which the disclosure pertains from a perusal of the claims, the appended drawings, and the following detailed description of the preferred embodiments.

BRIEF DESCRIPTION OF THE DRAWINGS

FIG. 2a is an illustration of the operation of a prior art non-translating repeater station.

FIG. 2b is an illustration of the operation of a prior art translating repeater station.

DETAILED DESCRIPTION

Figure 1:
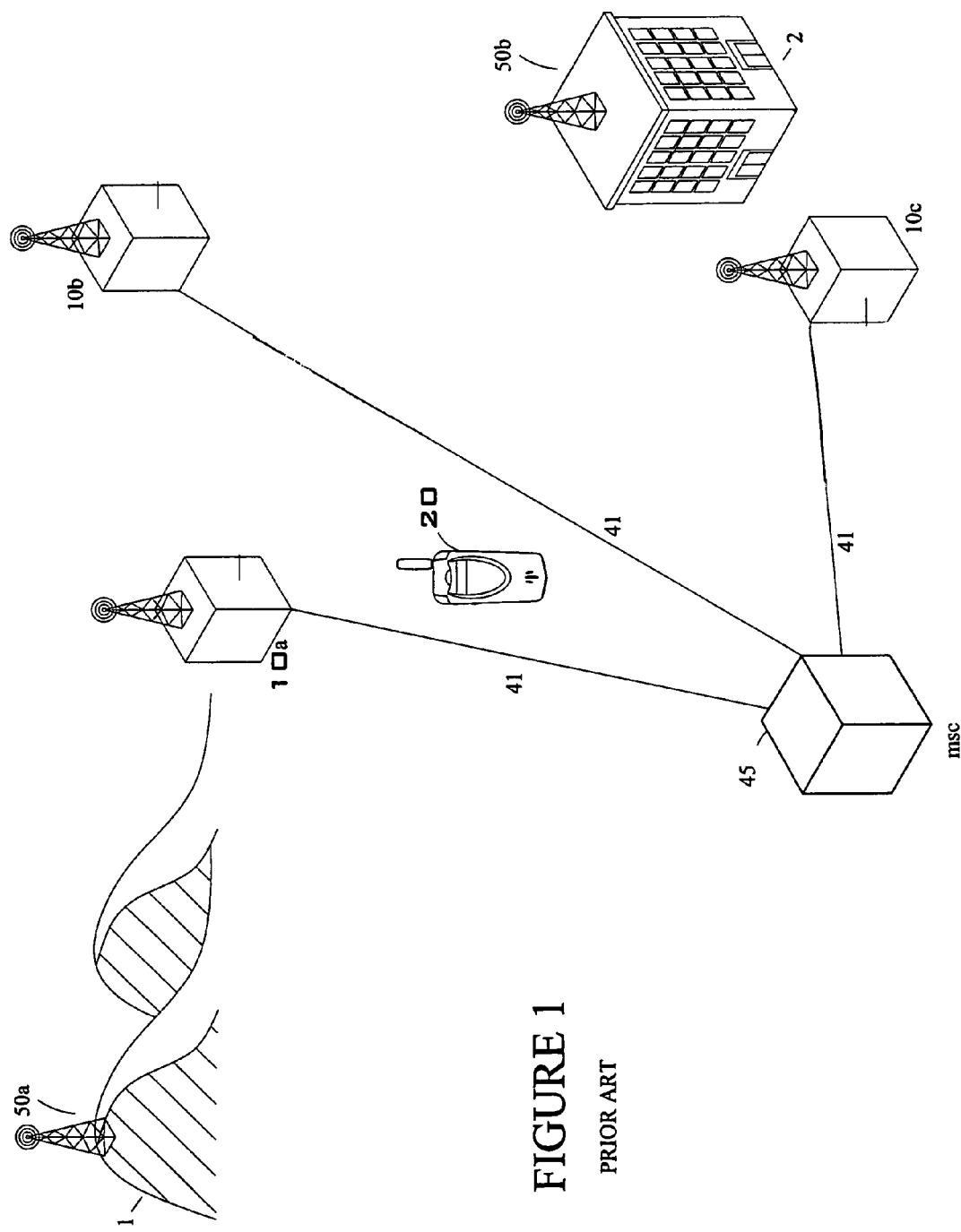
FIG. 1 is a prior art wireless communication system.
Figure 3:
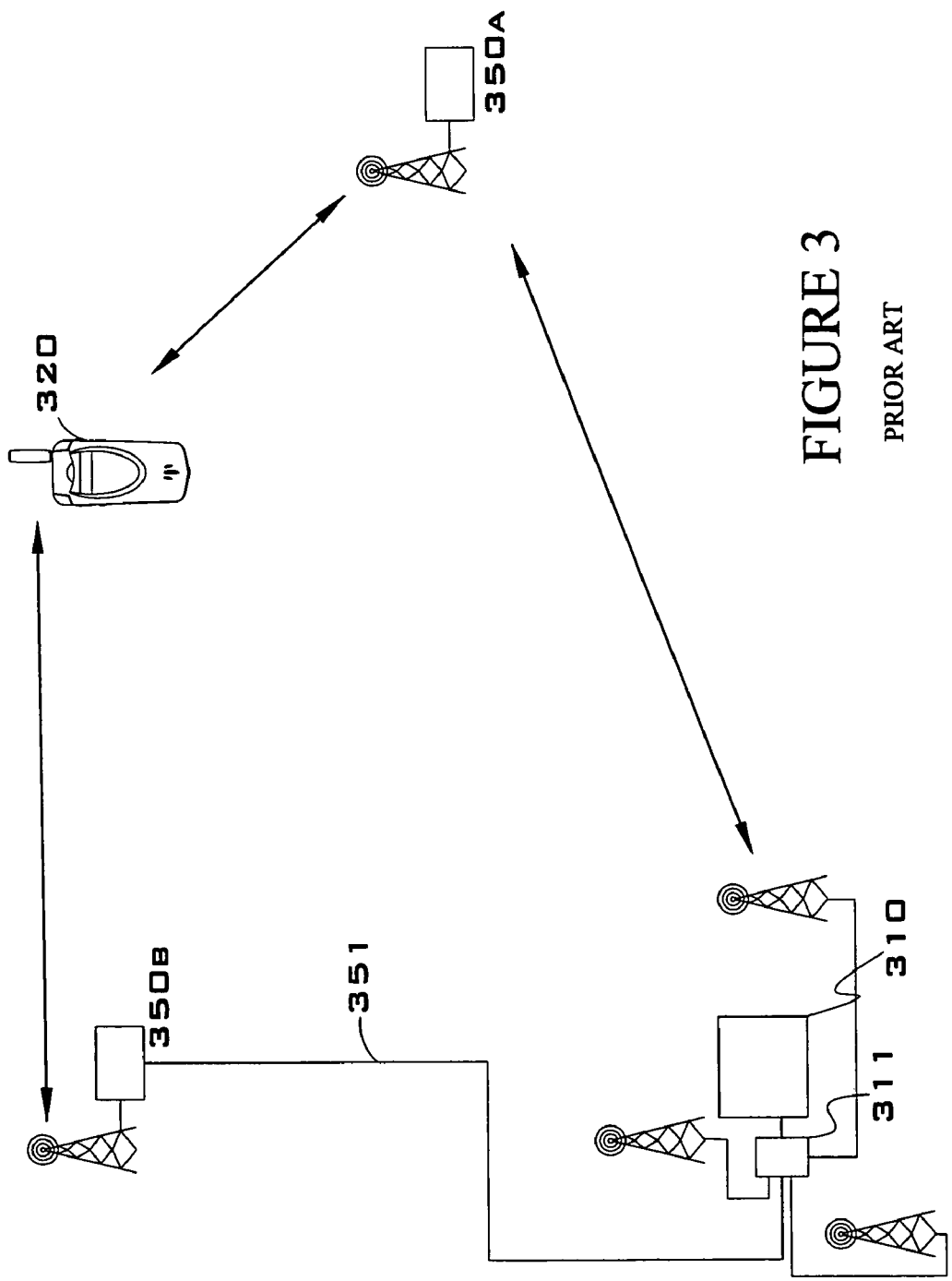
FIG. 3 is an illustration of a prior art wireless communication system with repeater stations connected with an RF link and over a tether.

For the purposes of describing the present subject matter, a communication system is the entirety of an information source (e.g., a mobile transmitter), a transmitted signal conveying that information, a communication path or link/channel, devices along the path through which the signal passes (e.g., a repeater), a host network and an intelligent receiver (e.g., scanning receiver) distinct from the host network.

The current subject matter relates to a method to determine if a mobile station operating in a wireless network utilizing a repeater is communicating with the base station through the repeater or other network devices or directly with the base station. As previously discussed, repeaters are used to "repeat" the RF signal to enhance range, coverage or service quality; and, mobile appliances attached to the wireless network and used as terminal devices for voice or data interfacing.

A wireless operator may want to know how a particular mobile appliance is being served in an area to understand how his wireless network is operating or to size and provision repeaters or other network equipment in an area.

The present subject matter discloses an augmentation to the repeater(s) to assist the network in determining which mobile appliances are operating through the repeater(s).

The augmentation is composed of a scanning receiver and a mechanism for interfacing to a data service used to communicate with the manager. The augmentation may be housed in the repeater and may be connected to the repeater-to-mobile antenna of the repeater. Alternatively, the augmentation may have an antenna and receiver independent of the repeater. Moreover, the augmentation may be physically and operably independent of the repeater altogether. The augmentation scans the reverse link channels where a mobile appliance might transmit and measures energy and/or signal characteristics. These channels can be represented as RF frequencies, time slots, spreading codes or any combination thereof. These measurements may be used to determine if a mobile appliance is operating in the proximity of the repeater antenna. If signal strength and/or quality are high (or within a certain band), then it may be assumed that the mobile is operating through the repeater.

The measurements and/or channel indicators for a mobile appliance determined to be operating through the repeater are transmitted to the manager. The measurements may be analyzed at the augmentation or at the manager to arrive at such a determination. The measurements can be analyzed based on signal strength, particular band of received power, or signal characteristics. The band of received power may be mapped to the power management algorithms that a particular air interface will employ to control the power level of a mobile appliance. Decoding of certain signal characteristics (i.e., presence of sync codes) may indicate sufficient power level to measure signal characteristics, and provide positive indication that the signal energy on that channel is from a device connected to the wireless network of interest.

The measurements or analyses are sent over an interface from the augmentation to the manager over a data service. The data service is most conveniently a data transport mechanism supported by the wireless network of interest. For example, in a Global System for Mobile Communication (GSM) network that supports General Packet Radio Service (GPRS), the measurement data from the augmentation or channel results could be transferred to the manager using this data service. Short Message Service (SMS) services available in TDMA and GSM are also candidates. Wireless connections (e.g., T1, modem, frame relay) are also an option. The manager serves as the control and management device for the augmentation(s), and as an interface point for access to the list of mobile appliances operating through certain repeaters. The manager can have data files indicating where repeaters with augmentations are located in the network, and through connections to other wireless network entities, translate channel information to mobile identity information. In a GSM network, this might consist of translating a traffic channel assignment to a Temporary Mobile Station Identifier (TMSI) or Mobile Station International ISDN Number (MSISDN) through access to network data at the Base Station Controller (BSC) or HLR/VLR.

Implementation of the augmentation and manager in the described fashion is convenient and cost effective. The functions incorporated into the augmentation are formed from common building blocks found in commercial handsets. Thus, the augmentation may be added to a repeater for a fraction of the recurring cost of handset components. The manager may be conceived as a new software component executing on an existing computing device in a wireless network, shared with other functions associated with network entities to which it would be easy to interface.

An important aspect of the presently disclosed subject matter is that the communication network can determine when a received signal from a mobile has passed through a repeater or other network devices. Prior art systems do not have this capability and consequently treat all the received signals as having been directly received from the target mobile. The foregoing embodiments are exemplary only and shall not be used to limit the invention. These examples and others are discussed in more detail below.

Figure 4:
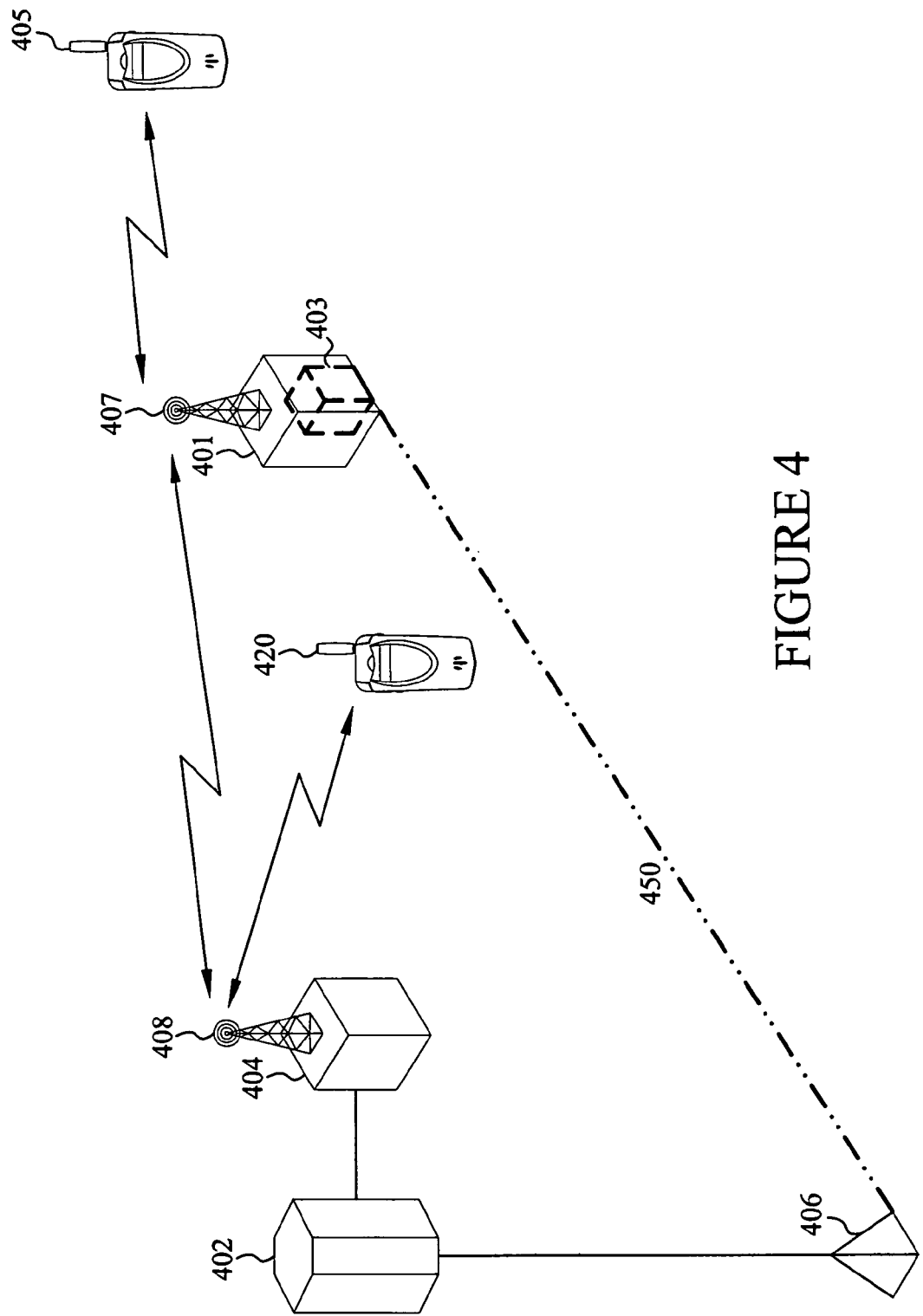
FIG. 4 is a representative flow chart for the operation of a repeater in an embodiment of the present subject matter.

FIG. 4 is a representation of a network analysis system within a communication system according to an embodiment of the present disclosure. The communication system includes a repeater 401, a base station 404, and a base station controller 402, as well as a plurality of mobiles, 420 and 405. As illustrated, the mobile 420 communicates directly with the base station 404, and the mobile 405 communicates with the base station 404 through the repeater 401. Antennas 408 and 407 are associated with the base station 404 and the repeater 401, respectively. The repeater 401 is augmented with a scanning receiver that communicates with a manager over an interface 450. The interface 450 may take the form of a separate channel within the communication system or a dedicated wireless, wireline or other communication link.

Figure 5:
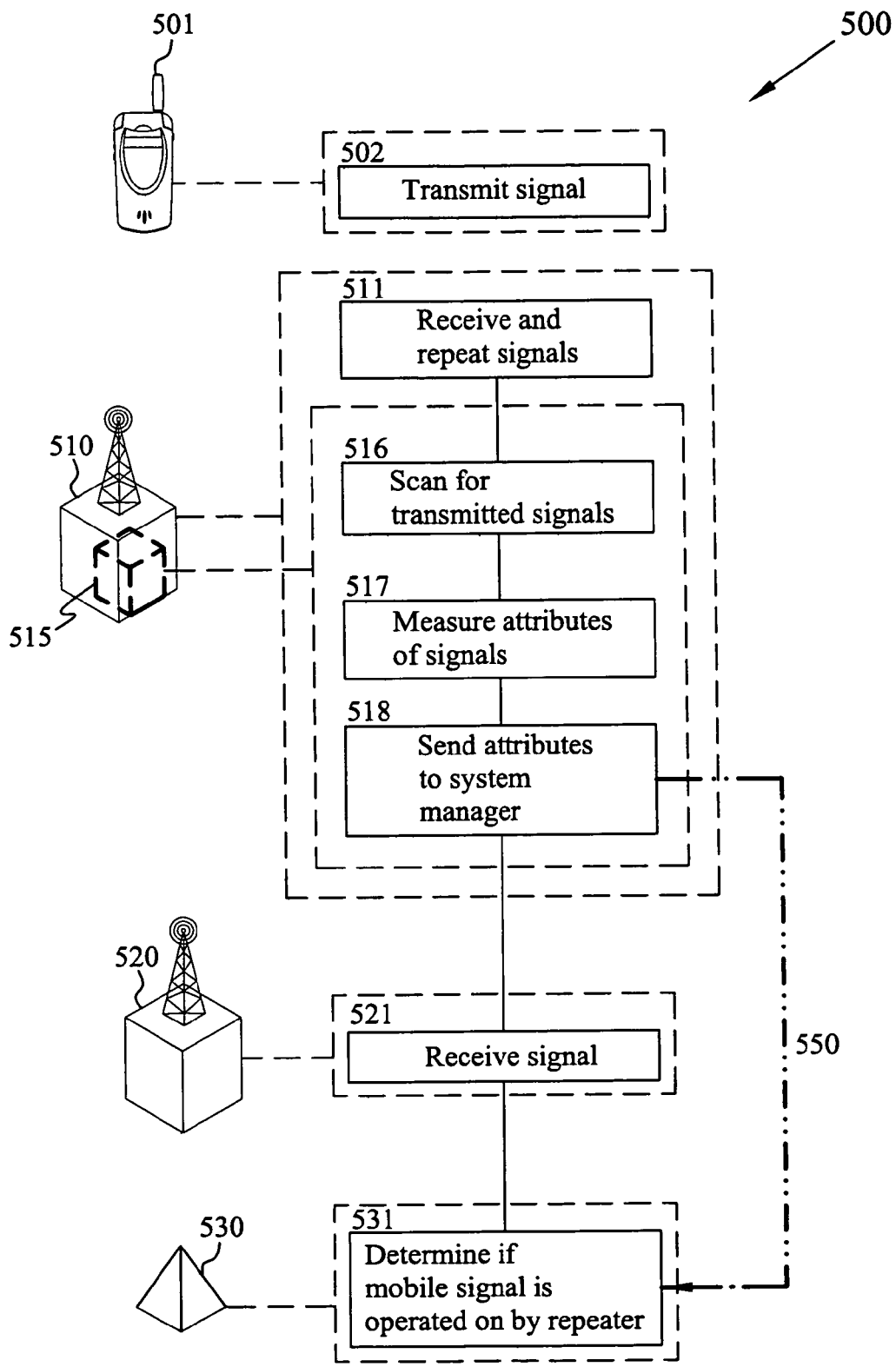
FIG. 5 is a representative flow chart for the operation of a network analysis system according to an embodiment of the present subject matter.

FIG. 5 is a representational flow chart of a method for detecting a mobile operating through a repeater according to an embodiment of the present subject matter. The mobile 501 transmits an information signal. The repeater 510, in normal operation, receives, amplifies and retransmits the signal as shown in Block 511. The scanning receiver 515 associated with the repeater scans for transmitted signals; and, upon acquiring the transmitted signal, either from the repeater or an independent antenna, the scanning receiver measures attributes of the signal as shown in Block 517. In Block 518, the scanning receiver 515 or augmentation sends the measurement of the attribute of the signal to the manager 530 over a communication interface 550. Alternatively, an analysis of the measured attributes can be conducted at the augmentation and the results of the analysis may be forwarded to the manager 530. The base station 520 receives the signal in Block 521 and operates in a normal fashion, with the operation of the augmentation 515 and manager 530 being transparent to the base station. The manager 530, upon receiving the measured attributes or analyses, determines if the mobile's signal is likely operated upon by the repeater 510. This determination is preferably based on proximity of the mobile to the repeater. For example, if the augmentation 515 measures a high transmit power level, as related to a threshold as in the case of mobile 405, then it is likely that mobile 405 is served by the repeater 510. However, if the transmit power level is below a predetermined level or threshold, as is likely for mobile 420, then it is not likely the mobile 420 is served by the repeater 510. The measured attributes may include signal strength, signal to noise ratio (SNR), band of received power, or other signal characteristics. In addition to communication of the measured attributes, the augmentation 515 also preferentially sends a channel or other identifier relating the measured attributes to the signal measured.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. A wireless communication system comprising:
a plurality of base stations;
at least one mobile appliance;
at least one repeater; and
a control and management device,
wherein the at least one repeater further comprises
a scanning receiver, and
an interface wherein the scanning receiver is adapted to measure attributes of reverse link channels to determine whether a signal has been served by the at least one repeater or has been received directly from a mobile appliance and wherein the interface operably connects the at least one repeater and the control and management device,
wherein the attributes are selected from the group of signal characteristics, signal strength, and band of received power.

2. The wireless communication system of claim 1, wherein the scanning receiver is connected to an antenna of the at least one repeater.

3. The wireless communication system of claim 1, wherein the at least one repeater and control and management device are connected via a wireless channel of one of the plurality of base stations.

4. The wireless communication system of claim 1, wherein the control and management device is connected to mobile switching center.

5. A method of determining if a signal, from a source transmitter, received at a receiver has passed through a network device comprising:
scanning signals at the network device;
measuring an attribute of the scanned signals;
communicating to a system manager the attributes of the scanned signals measured at the network device; and,
determining which signals are served by the network device or are received directly from a mobile appliance based at least in part of the measured attributes,
wherein the attributes reflect a proximity to the network device, and
wherein the attributes are from the group of signal strength, signal characteristics, and band of received power.

6. The method of claim 5, wherein the network device is a repeater.

7. The method of claim 5, wherein the network device is a micro station.

8. The method of claim 5, wherein identifiers of the reverse channel are communicated along with the attributes.

9. The method of claim 8, wherein the identifiers of the reverse channel are translated into mobile appliance identity information with information provided from a mobile switching center.

10. The method of claim 5, wherein the attributes are communicated to the system manager via the receiver.

11. The method of claim 5, wherein the attributes are compared to a threshold at the system manager.

12. A method of determining if a mobile appliances signal received at a base station has been operated on by one or more repeaters comprising:
scanning reverse channel signals at the one or more repeaters;

measuring one or more attributes of the scanned reverse channel signals;

transmitting to a system manager over a link the attributes of the scanned reverse channel signals and channel information of the reverse channel signals;

determining the proximity of the mobile appliance to the one or more repeaters based at least in part by the measured attributes; and determining which reverse channel signals are served by the one or more repeaters based at least in part by the proximity of the mobile appliance to the one or more repeaters.

13. The method of claim 12, wherein the attributes comprise the group of signal strength, band of received power and signal characteristics.

14. The method of claim 12, wherein the link is a wireless communication channel.

15. The method of claim 12, wherein the link is a wireline.

16. The method of claim 12, wherein the attributes are compared to thresholds at the system manager.

17. The method of claim 12, wherein the channel information is translated into mobile appliance identity information with information provided from a mobile switching center.

* * * * *